Nov. 22, 1966  R. J. PERDREAUX  3,286,532
INTEGRATING VARIABLE TIME DELAY DEVICE
Filed Aug. 31, 1962
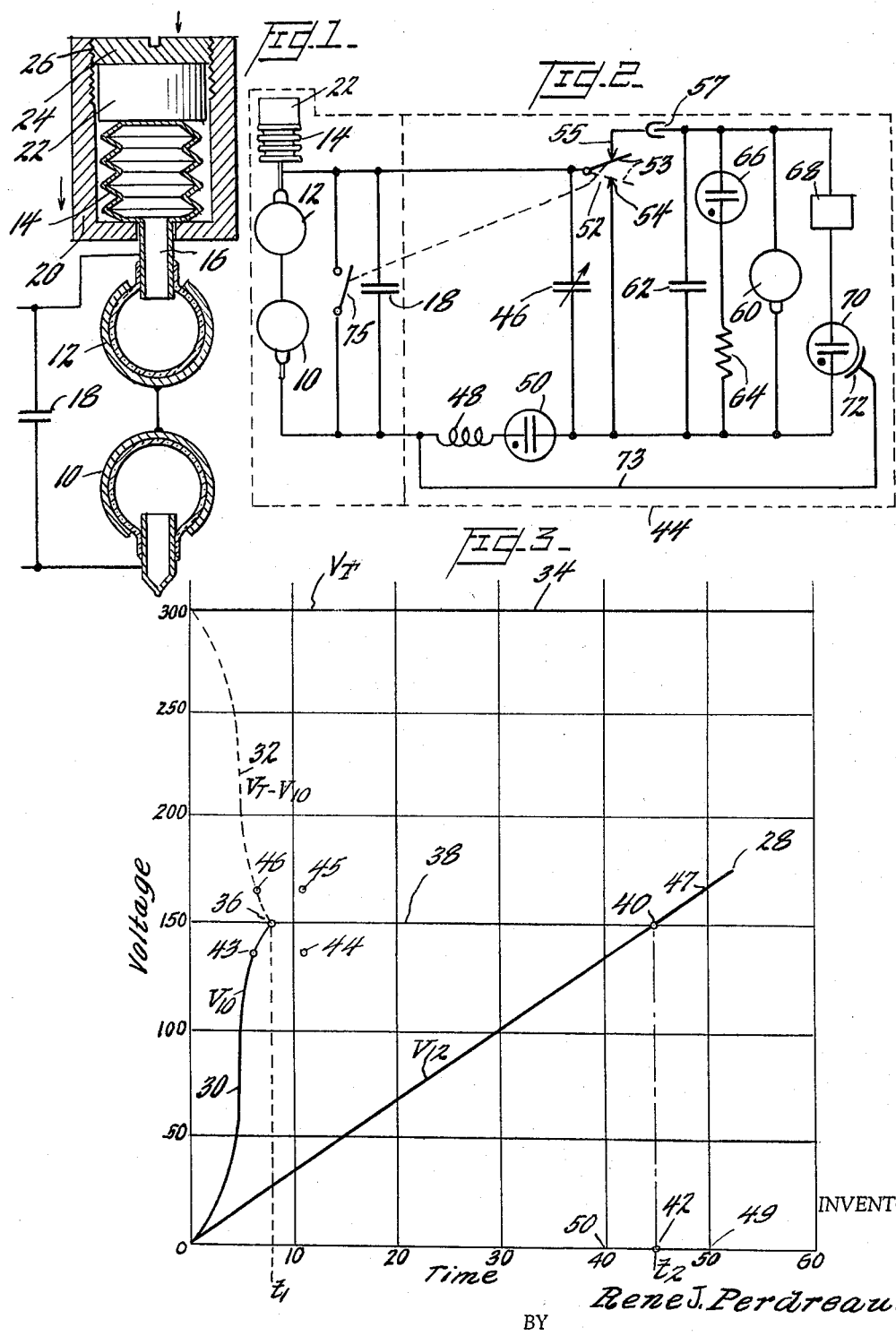
INVENTOR
Rene J. Perdreaux
BY
ATTORNEYS

United States Patent Office 3,286,532
Patented Nov. 22, 1966

3,286,532
INTEGRATING VARIABLE TIME DELAY DEVICE
Rene J. Perdreaux, Brooklyn, N.Y., assignor to Leesona Corporation, Warwick, R.I., a corporation of Massachusetts
Filed Aug. 31, 1962, Ser. No. 220,635
8 Claims. (Cl. 73—503)

This invention relates to an electrical integrating variable time delay device and, more particularly, to a self-powered device which is economical and compact. Priorly, numerous forms of variable time delay devices have been employed; however, none of these devices have been included integrating networks which respond to external forces to compensate a time delay network when a variable external force has been exerted.

Accordingly, it is an object of this invention to provide a compensated variable time delay device which includes an integrating network which responds to external forces.

It is another object of this invention to provide an improved electrical system which is self-powered, has a long shelf life, is small and light in weight.

It is a still further object of this invention to provide an electrical integrating network which responds to external forces while being capable of withstanding transverse shock, transverse vibration, transverse acceleration, and wide temperature ranges.

It is another object of this invention to provide an integration network which responds to external forces such as the force of acceleration and integrates these forces in a very reliable manner.

Briefly, in accordance with aspects of this invention, an integrating network is provided which includes a pair of cells serially connected in polarity opposition with means for varying the current of one of the cells in a manner proportional to an external force on the means, the integrating circuit including an integrating capacitor connected to the two cells to receive the algebraic total current from the two cells. In one illustrative embodiment, the cells are nuclear cells employing a radioactive gas, such as krypton 85, and the force responsive means is a gas chamber external to one of the cells and having a gas communicating passage connected therebetween. The gas chamber is advantageously formed as a bellows so that it can respond to external forces in a manner to change the interior volume of the chamber. Because the cell current varies linearly with the concentration of the radioactive material within the cell, changes in the volume of the gas chamber cause proportional changes in the concentration of the radioactive material in the cell and thus, cause linear changes in the cell current. In this illustrative embodiment, the two radioactive cells are connected in polarity opposition with a capacitor connected across the remaining cell terminals. The current flowing to the capacitor will be the algebraic difference of the currents from the two cells indicative with difference in potential of these two cells. By adjusting the volume of the gas chamber external to the one cell, the terminal potential of the two cells may be made equal and thus, there will be no charge in the integrating capacitor. If the gas chamber is now subjected to an external force, such as the force of acceleration, the volume of the chamber will change causing the one cell to have a higher potential than the other cell. This difference in potential between the two cells will cause a charging current to flow to the integrating capacitor. If the force applied to the gas chamber decreases, then the associated cell potential decreases and no further current flows to the integrating capacitor.

If, however, a force is again applied to the chamber and the potential difference between the two cells becomes unbalanced, current again flows to the integrating capacitor. Thus, the charge on the capacitor at any time after the variable force has been applied to the gas chamber, is proportional to the integral of the applied force over the period during which the force was applied.

If this integrating circuit is coupled to a time delay circuit, a force responsive, integrating variable time delay system is produced. Thus, the system can be made to respond to an external force and to integrate the external force so as to alter the time delay portion of the current.

Accordingly, it is a feature of this invention to provide an integrating circuit with a pair of cells connected in polarity opposition, means for changing the potential for one of the cells and an integrating circuit connected across the cells to integrate the algebraic difference of the current from the two cells.

It is another feature of this invention to employ a pair of nuclear cells connected in polarity opposition with means for varying the amount of nuclear material in one of the cells and an electrical integrating circuit connected to the remaining terminals of the two cells.

It is another feature of this invention to connect a force responsive integrating circuit to a time delay circuit to alter the effective time delay obtained from the time delay circuit as a function of the force applied which time delay circuit, after a predetermined delay, delivers an output signal to its associated load.

These and various other objects and features of the invention will be more clearly understood from a reading of the detailed description of the invention in conjunction with the drawing in which:

FIG. 1 is a combined pictoral and schematic representation of one illustrative embodiment of the integrating network;

FIG. 2 is a schematic representation of one illustrative integrating time delay device; and FIG. 3 is a graphical solution of the integrating time delay system.

Referring now to FIG. 1, there is depicted an integrating system employing a first cell 10, a second cell 12 connected in polarity opposition to the first cell, an external chamber 14 having a conduit 16 communicating with the interior of the cell 12 and a capacitor 18 connected to the remaining terminals of cells 10 and 12. In this particular embodiment, the chamber 14 is enclosed in a suitable housing 20 and a mass 22 is positioned in contact with the chamber 14 and is retained within the container 20 by means of a cap 24 which threadably engages the container 20 as indicated at 26. Because the chamber 14 is fabricated in the form of a bellows, the volume of this chamber will decrease in direct proportion to the force applied by the mass 22. If mass 22 is subjected to a variable force of acceleration, then the volume of the chamber 14 will be decreased in a manner proportional to the force of acceleration and will cause a portion of the material in the chamber 14 to be delivered to the interior of cell 12. The increase of material within the cell 12 will cause the potential of cell 12 to rise above the potential of cell 10 and thus, cause a current to be delivered to the integrating capacitor 18, which current is, of course, equal to the algebraic difference of the current from cells 10 and 12. The adjustable cap 24 may be rotated until the terminal potential of cell 12 is equal to cell 10 and thus, no current will flow to the integrating capacitor 18. If, at any time subsequent to this initial adjustment, a force is applied to the chamber 14, such as by means of mass 22, the decrease in volume of chamber 14 will be reflected in a linearly proportional increase in current to the integrating capacitor 18. It is, of course, understood that any other form of integrating network may be substituted for capacitor 18 to produce the same result.

The circuit of FIG. 1 may advantageously be combined with a time delay circuit as indicated by block 44 of FIG. 2. The time delay circuit includes a variable capacitor 46 connected in parallel with capacitor 18 by means of an inductance 48 and a gas discharge diode 50.

A single pole, double throw switch 52, is employed and when the armature 53 makes contact with stationary contact 54, the switch defines a short circuit path for capacitor 46. If the armature 53 is moved and the contact with stationary contact 55 is closed, capacitors 18 and 46 are connected to an ion chamber 57. Advantageously, this ion chamber acts as a constant current device to meter the current fed to the remaining portion of the time delay circuit. Such devices may be obtained commercially in the United States from Victoreen Instrument Company, Cleveland, Ohio, to meet various ranges of voltage and current requirements. This remaining portion of the time delay circuit includes a nuclear cell 60 connected in parallel with a storage capacitor 62. A voltage regulator network is connected in parallel with cell 60 and includes resistor 64 and a gas diode 66. Elements 60, 62, 64 and 66 constitute a voltage regulated power supply. This supply is described in detail in U.S. Patent No. 3,005,942. The circuit is connected to a suitable load 68 by a connection between the cell 60 and one terminal of the load and a gas discharge device 70 connected between the other terminal of cell 60 and the load 68. The gas discharge device 70 includes a trigger electrode 72 which is connected by means of conductor 73 to one terminal of inductance 48. The system of FIG. 2 includes a starting switch 75 which normally short circuits capacitor 18 and nuclear cells 10 and 12. This switch is mechanically connected to switch 53 such that contact 53 closes with contact 55 when switch 75 is opened. Contact 53 also maintains a short current on capacitor 18 when in contact with 54. Thus, when switch 75 opens, the operation of the entire device is initiated.

When it is desired to initiate the operation of the system, switch 75 is opened by any convenient means (not shown). After the switch 75 is opened, forces applied to the chamber 14 cause changes in the volume of the chamber and when the volume decreases, nuclear material is delivered from chamber 14 to cell 12. This increasing concentration of nuclear material causes cell 12 to produce a greater potential than cell 10 and thus causes current to be delivered to capacitor 18. Because the armature of switch 75 is mechanically connected to armature 53, when the armature of switch 75 is opened, switch 53 is in the solid line position, making contact with stationary contact 55. The regulated power supply feeds current from capacitor 62 at a constant rate through the ion chamber 57 (acting as a constant current device) and contacts 55 and 53 to capacitor 46. When the potentials of capacitors 18 and 46 are equal to the breakdown potential of gas diode 50, the gas diode 50 conducts. The conducting pulse is developed across inductance 48 and is applied as a triggering pulse through conductor 73 to the trigger electrode 72 causing diode 74 to discharge permitting the charge on capacitor 62 to flow into the load, thereby actuating the load.

Analyzing the operation of the system mathematically for initiation of the entire system, we have the relationship:

$$V_{10} + V_{12} = V_T \quad (1)$$

where $V_{10}$ is the voltage on capacitor $C_{18}$
$V_{12}$ is the voltage on capacitor $C_{46}$
$V_T$ is the breakdown voltage of cold cathode gas diode 50;

and $$V_{10} = \frac{(I_{12} - I_{10})t_1}{C_{18}} \quad (2)$$

$$V_{12} = \frac{I_t t_2}{C_{46}} \quad (3)$$

substituting we have:

$$\frac{(I_{12} - I_{10})t_1}{C_{18}} + \frac{I_t t_2}{C_{46}} = V_T \quad (4)$$

from which $$t_2 = \frac{C_{46}}{I_t}\left(V_T - \frac{(I_{12} - I_{10})t_1}{C_{18}}\right) \quad (5)$$

for the special case where $$V_{10} = \tfrac{1}{2} V_T \quad (6)$$

that is $$V_T = 2V_{10} \quad (7)$$

we can substitute in equation above and find $$t_2 = \frac{C_{46}}{I_t}(2V_{10} - V_{10}) \quad (8)$$

$$t_2 = \frac{C_{46}}{I_t}(V_{10}) \quad (9)$$

Therefore, changes in $V_{10}$ reflect themselves as the same percentage change in time delay $t_2$.

The graphical solution of the circuit of FIG. 2 and Equation 1 is shown in FIG. 3 which is a graphical representation of time as the abscissa and voltage as the ordinate. On this graph, the straight line 28 represents the linear charging rate of capacitor 46. Curve 30 represents the potential on capacitor 18 due to the application of a force to the mass of cell 12 via the interval $t_1$. In this instance, a non-linear force has been applied. The curve 32 represents the difference of this variable potential indicated by curve 30 and the fixed breakdown voltage $V_T$ of cold cathode gas diode 50. Since initiation occurs when $V_{12} = V_T - V_{10}$, marked by line 38 connecting points 36 and 40, the abscissa of point 40, as represented by 42, represents the time delay of the circuit. The points 43 and 46 represent a decrease of 10% in the curve 30 which through points 47 and 49 shows an increase of 10% in the time $t_2$. The points 45 and 44 represent an increase of 10% in the curve 30 which through points 48 and 50 shows a decrease of 10% in time $t_2$.

Equation 1 is solved graphically in FIG. 3 for an assumed set of normal launching conditions and a time delay of 45 seconds. From this figure it can be seen that as $V_{10}$, which might be the integrated acceleration (velocity) of a rocket, changes, there will be a corresponding compensation of the time delay to provide actuation at the proper range from the launcher.

The time delay, of course, can be altered by changing the value of variable capacitor 46, thereby altering the slope of curve 28.

While I have shown and described one illustrative embodiment of this invention, it is understood that other embodiments may be employed without departing from the spirit and scope of this invention.

What is claimed is:

1. An integrating time delay device comprising a pair of current producing cells connected in polarity opposition, means for varying the potential of one of said cells in response to an external force, an integrating device connected to the remaining terminals of said cells, a circuit connected in parallel with said integrating device including a capacitor, a gas diode and an inductance connecting the integrating device to a first terminal of the capacitor, a constant current device connected to the other terminal of said capacitor, a load having one terminal connected to said constant current device, a gas discharge device connected between said gas diode and the other terminal of said load, a further current producing cell connected in parallel with said load and said gas discharge device, a voltage regulator network connected in parallel with said last mentioned cell and a capacitor connected in parallel with said voltage regulator network, said gas discharge device including a trigger electrode connected to said inductance, said gas diode having a breakdown potential whereby said integrating time delay device integrates current from said serially connected cells resulting from changes in said external force and, after a compensated time delay is obtained from said integrating device said diode breaks down to deliver a pulse to the trigger electrode, thereby causing said gas discharge device to conduct and deliver current to said load from said further cell.

2. An integrating and time delay device according to claim 1, wherein said cells are nuclear cells.

3. A device according to claim 2, wherein said means for changing the potential of one of said cells is a chamber filled with nuclear material and communicating with one of said cells, said chamber having at least one deformable wall.

4. A device according to claim 3, wherein said integrating means is a capacitor.

5. A device according to claim 3, wherein said constant current device is an ion chamber.

6. An integrating circuit for integrating external forces comprising a pair of nuclear cells connected in polarity opposition, means responsive to external forces for changing the potential of one cell and integrating means connected in parallel with said cells wherein the integrating means stores a potential proportional to the integral of the force applied to said one cell, and said means for changing the potential of one of said cells is a chamber of nuclear material communicating with one of said cells including means therein for supplying a variable amount of nuclear material to said one cell in response to the application of an external force to said material within said chamber.

7. A circuit according to claim 8, wherein said chamber has deformable walls whereby the volume of said chamber decreases in response to the application of said external force.

8. An integrating circuit according to claim 7, wherein said integrating means is a capacitor.

References Cited by the Examiner

UNITED STATES PATENTS

| | | | |
|---|---|---|---|
| 2,271,478 | 1/1942 | Eldredge | 324—111 |
| 2,622,865 | 12/1952 | Sundt | 73—503 |
| 2,704,326 | 3/1955 | Whitson et al. | 328—1 |

FOREIGN PATENTS 668,164   3/1952   Great Britain.

DAVID L. GALVIN, *Primary Examiner.*